(12) United States Patent
Kimura et al.

(10) Patent No.: US 11,473,940 B2
(45) Date of Patent: Oct. 18, 2022

(54) ABSOLUTE LINEAR ENCODER

(71) Applicant: DMG MORI CO., LTD., Nara (JP)

(72) Inventors: Akira Kimura, Kanagawa (JP);
Katsuhiko Ono, Kanagawa (JP)

(73) Assignee: DMG Mori Co., Ltd., Nara (JP)

(*) Notice: Subject to any disclaimer, the term of this patent is extended or adjusted under 35 U.S.C. 154(b) by 260 days.

(21) Appl. No.: 17/067,122

(22) Filed: Oct. 9, 2020

(65) Prior Publication Data
US 2021/0108948 A1    Apr. 15, 2021

(30) Foreign Application Priority Data

Oct. 9, 2019    (JP) .............................. JP2019-185875

(51) Int. Cl.
*G01D 5/249* (2006.01)
*G01D 5/347* (2006.01)

(52) U.S. Cl.
CPC ..... *G01D 5/34746* (2013.01); *G01D 5/34784* (2013.01)

(58) Field of Classification Search
CPC ........... G01D 5/34746; G01D 5/34784; G01D 5/34792; G01D 2205/10; G01D 5/2492
See application file for complete search history.

(56) References Cited

U.S. PATENT DOCUMENTS

| | | | | | |
|---|---|---|---|---|---|
| 5,565,864 | A | * | 10/1996 | Ohno | ................... G01D 5/2492 341/11 |
| 7,289,932 | B2 | * | 10/2007 | Woody | ................. G01D 5/2492 702/145 |
| 2016/0320212 | A1 | * | 11/2016 | van de Kerkhof | .. G01D 5/2497 |

FOREIGN PATENT DOCUMENTS

JP    3184939 B2    7/2001

OTHER PUBLICATIONS

T. Morita, "Current and Future Trends of the Encoders," Journal of the Japan Society for Precision Engineering, vol. 82., No. 9, 2016, p. 797-802.
Espacenet English abstract of JP 3184939 B2.
T. Morita, "Current and Future Trends of the Encoders," Journal of the Japan Society for Precision Engineering, vol. 82., No. 9, 2018, p. 797-802.

* cited by examiner

*Primary Examiner* — Tony Ko
(74) *Attorney, Agent, or Firm* — Sheppard Mullin Richter & Hampton LLP

(57) ABSTRACT

This invention provides a linear encoder having an arbitrary size while maintaining high producibility.
An absolute linear encoder includes a long scale formed by continuously connecting a first short scale and a second short scale in which a first cyclic bit string and a second cyclic bit siring generated using the same initial value for different generator polynomials are arranged, and at least two sensors arranged at positions facing the long scale side by side in a longitudinal direction of the long scale.

6 Claims, 7 Drawing Sheets

| TAP POSITION | PERIOD | |
|---|---|---|
| [1,2] | 73 | |
| [1,3] | 465 | |
| [1,4] | 21 | |
| [1,5] | 511 | M-SEQUENCE |
| [1,6] | 511 | M-SEQUENCE |
| [1,7] | 21 | |
| [1,8] | 465 | |
| [1,9] | 73 | |

FIG. 4B

Tap Position : [1,5]
ORDER : BIT STRING : SKIP
00001 : 000000001 : 130
00002 : 100000000 : 0
00003 : 010000000 : 129
00004 : 001000000 : 258
00005 : 000100000 : 417
00006 : 000010000 : 5
00007 : 100001000 : 502
00008 : 010000100 : 323
00009 : 001000010 : 60
00010 : 000100001 : 10
00011 : 100010000 : −5
00012 : 110001000 : 493
00013 : 011000100 : 459
00014 : 001100010 : 135
. . . . .
. . . . .

FIG. 4C

ABSOLUTE LINEAR ENCODER

This application is based upon and claims the benefit of priority from Japanese patent application No. 2019-185875, filed on Oct. 9,2019. the disclosure of which is incorporated herein in its entirety by reference.

BACKGROUND OF THE INVENTION

Field of the Invention

The present invention relates to an absolute linear encoder.

Description of the Related Art

In the above technical field, patent literature 1 and non-patent literature 1 disclose techniques concerning an absolute linear encoder.
[Patent Literature 1] Japanese Patent No. 3184939
[Non-Patent Literature 1] Journal of the Japan Society for Precision Engineering Vol. 82, No. 9, p. 797 (2016)

SUMMARY OF THE INVENTION

In the techniques described in the above literatures, however, it is impossible to provide a linear encoder having an arbitrary size while maintaining high productivity.

The present invention provides a technique of solving the above-described problem.

One example aspect of the present invention provides an absolute linear encoder comprising:
 a long scale formed by continuously connecting a first short scale and a second short scale in which a first cyclic bit string and a second cyclic bit string generated using the same initial value for different generator polynomials are arranged; and
 at least two sensors arranged at positions facing the long scale side by side in a longitudinal direction of the long scale.

According to the present invention, it is possible to provide a linear encoder having an arbitrary size while maintaining high producibility.

BRIEF DESCRIPTION OF THE DRAWINGS

FIG. 4B is a view for explaining the period of a cyclic bit string generated by the cyclic bit string generator while changing a tap position;

FIG. 4C is a view for explaining skip of cyclic bit strings; and

DESCRIPTION OF THE EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

FIRST EXAMPLE EMBODIMENT

Figure 1:
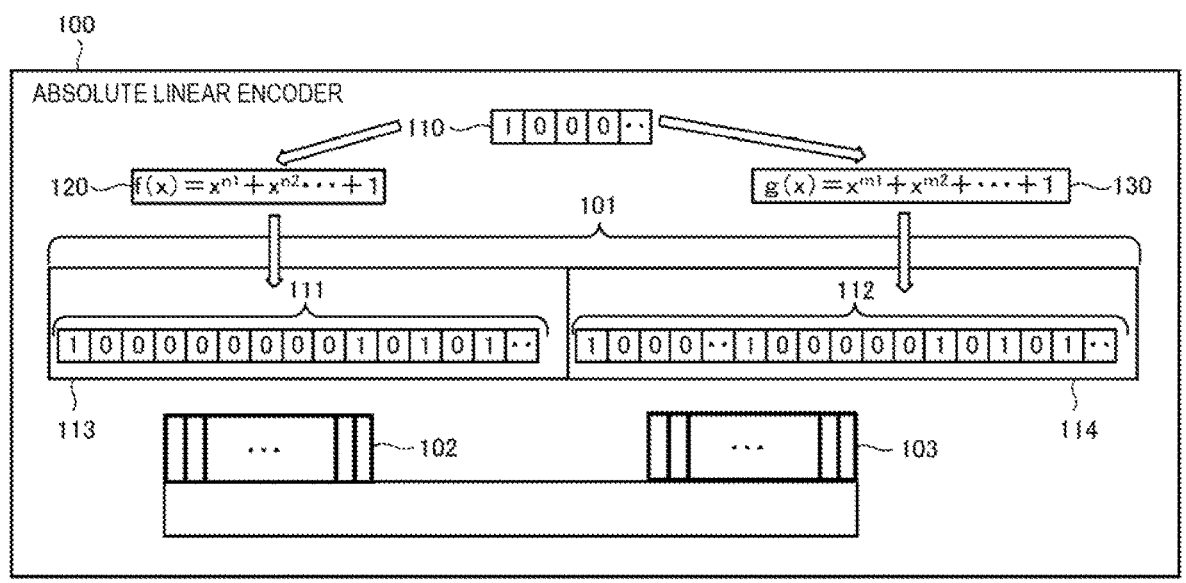
FIG. 1 is a block diagram showing the arrangement of an absolute linear encoder according to the first example embodiment.

An absolute linear encoder 100 according to the First example embodiment of the present invention will be described with reference to FIG. 1. The absolute linear encoder 100 is an encoder that detects an absolute position in a linear direction. As shown in FIG. 1, the absolute linear encoder 100 includes a long scale 101, and sensors 102 and 103. The long scale 101 is formed by continuously connecting short scales 113 and 114 in which cyclic bit strings 111 and 112 generated using the same initial value 110 for different generator polynomials 120 and 130 are arranged. The at least two sensors 102 and 103 are arranged at positions facing the long scale 101 side by side in the longitudinal direction of the long scale 101. The sensors 102 and 103 are arranged at a predetermined distance and move together.

According to this example embodiment, as compared to a case in which a long scale is generated by one cyclic bit string, it is possible to implement high productivity as in a case in which a long scale is generated and form a long scale in an arbitrary size.

SECOND EXAMPLE EMBODIMENT

Figure 2:
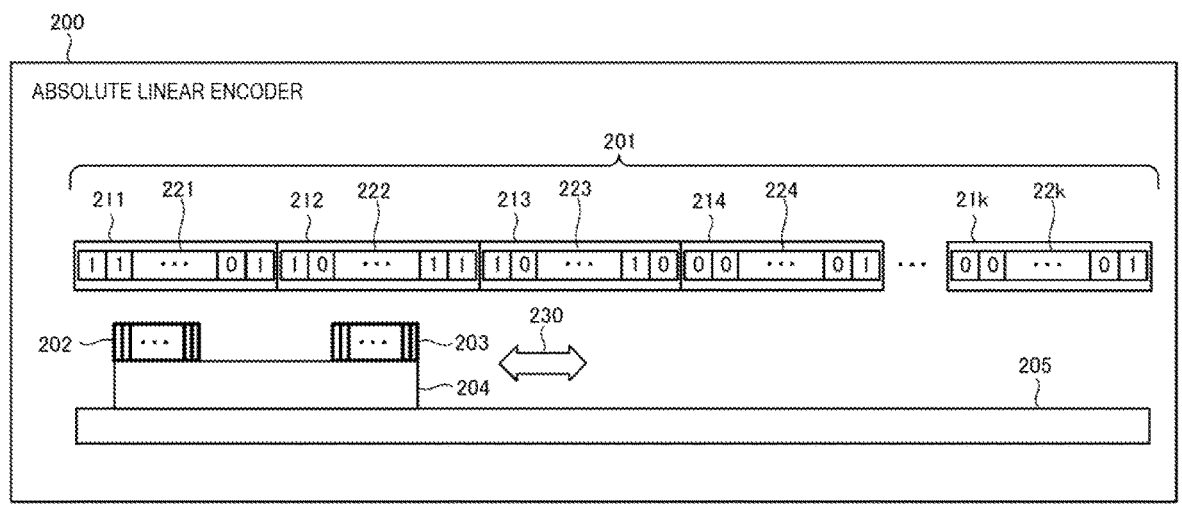
FIG. 2 is a view few explaining the outline of the overall arrangement of an absolute linear encoder according to the second example embodiment.

An absolute linear encoder 200 according to the second example embodiment will be described next with reference to FIGS. 2 to 5. FIG. 2 is a view for explaining the outline of the overall arrangement of the absolute linear encoder 200 according to this example embodiment. The absolute linear encoder 200 includes a long scale 201, sensors 202 and 203, a linear slider 204, and a slide rail 205.

The long scale 201 includes short scales 211, 212, 213, 214, and 21$k$. Cyclic bit strings 221, 222, 223, 224, and 22$k$ are arranged in the short scales 211, 212, 213, 214, and 21$k$, respectively. The short scales 211, 212, 213, 214, and 21$k$ are scales having the same length.

The cyclic bit strings 221, 222, 223, 224, and 22$k$ are hit strings with different arrangements. That is, the cyclic bit strings 221, 222, 223, 224, and 22$k$ are (2n−1)-bit cyclic bit strings generated using the same initial value for different generator polynomials, for example, using n-order generator polynomials (n-bit LFSR (Linear Feedback Shift Register)) and an n-bit initial value. Hence, in the cyclic bit strings 221, 222, 223, 224, and 22$k$, one unit is a (2n−1)-bit cyclic bit string.

At least one of the sensors 202 and 203 is a sensor of n or more bits. The sensor has n or more bits because it has (n+α) bits by providing redundant bits to correct an unstable portion such as a bit boundary. Note that the sensors 202 and 203 may be sensors with the same number of bits. The sensors 202 and 203 are arranged at a predetermined distance and move simultaneously. The number of sensors is not limited to two and may be three or more.

The linear slider 204 moves on the slide rail 205 in the direction of an arrow 230. As the linear slider 204 moves, the sensors 202 and 203 move on the slide rail 205 and read marks on the long scale 201.

Note that the cyclic bit strings 221, 222, 223, 224, and 22$k$ have been described above as cyclic bit strings by n-bit LFSRs. However, in the cyclic bit strings 221, 222, 223, 224, and 22*k*. for example, the cyclic bit string 221 may be a (2n−1)-bit cyclic bit string, and the remaining cyclic bit strings 222, 223, 224, and 22*k* may be cyclic bit strings each including bits less than (2n−1) bits. For example, if the LFSR includes 9 bits, the cyclic bit strings may be cyclic bit strings each including 511 or less bits.

Figure 3:
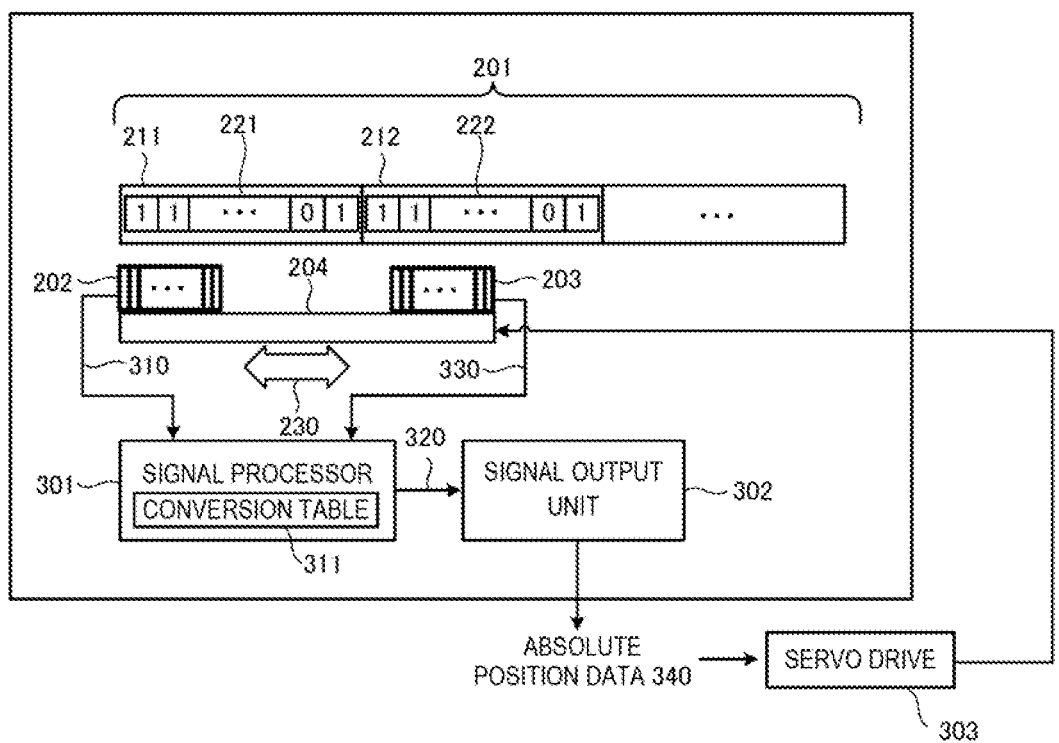
FIG. 3 is a view for explaining a processing method for signals output from sensors.

FIG. 3 is a view for explaining a processing method for signals output from the sensors 202 and 203. The sensor 202 reads out an absolute signal 310 from the cyclic bit string 221. Similarly, the sensor 203 reads out an absolute signal 330 from the cyclic bit string 222. The readout absolute signals 310 and 330 are input to a signal processor 301.

The signal processor 301 performs noise removal and redundant bit processing of the input absolute signals 310 and 330 and performs signal shaping. The signal processor 301 converts, using a conversion table 311, the absolute signals 310 and 330 after signal shaping into a binary data signal 320 with absolute position coordinates uniquely determined on the long scale. The binary data signal 320 is converted by a signal output unit 302 into a parallel signal, a serial signal, or an analog signal complying with a predetermined communication format and output to the outside.

Normally, the absolute position coordinate signal is input to a control device such as a servo drive 303 and used to operate a driver and the linear slider 204 fixed to that based on the position information.

Generation of a cyclic bit siring with an arbitrary length will be described next with reference to FIGS. 4A to 4C. An LFSR is a shift register whose input bit is a linear mapping in the immediately preceding state. An extraction position to perform XOR is called a tap, and the number of cyclic bits changes depending on the positions and the number of taps. The number of cyclic bits is 2n−1 at maximum. A cyclic bit with the longest period is called an M-sequence (Maximal length Sequence). A location can be specified by cyclically shifting the bit string to be generated and detecting the number of continuous register bits in an arbitrary location. Hence, the absolute linear encoder 200 according to this example embodiment uses a bit string of this type.

Figure 4A:
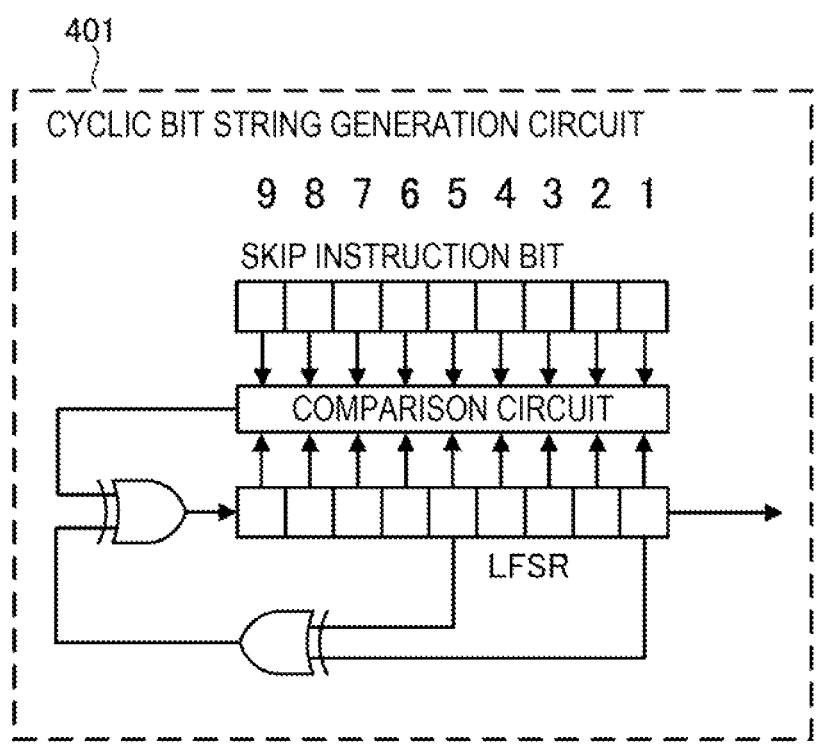
FIG. 4A is a view for explaining generation of a 9-bit cyclic bit string by a cyclic bit string generator.

However, for example, if a 9-bit LFSR is used in a cyclic bit string generator 401, as shown in FIG. 4A, a linear encoder with an arbitrary length cannot be implemented only by adjusting the tap position. For example, as shown in FIG. 4B, there are only 465 bits within the range of 257 to 510 bits, and there are fewer choices of lengths.

Consider skipping a part of a cyclic bit string while maintaining the cyclic characteristic. For example, in FIG. 4C, skip can be performed from 00006 to 00011, as can be seen. Here, skip means that when the value of the LFSR has become a specific value, new bits of the LFSR are forcibly inverted, thereby skipping the intermediate portion of an M-sequence and shortening the length. A position where skip is possible always exists in any location. However, since the numbers of bits that can be shortened, by skip are duplicated, it is difficult to obtain an arbitrary length. However, since bit strings that appear in a cyclic bit siring are so irregular that they are handled as random numbers, the numbers of bits that can be shortened by skip are distributed at random without being localized.

For this reason, when a plurality of skip positions are combined, the number of bits of an arbitrary length can be skipped. Additionally, a cyclic bit string with a different arrangement can be formed by changing the tap position. A cyclic bit string having an arbitrary length can be generated by combining the method of changing the tap position and the skip method. Then, a short scale having an arbitrary length can be formed using the generated cyclic bit string with an arbitrary length. When a plurality of short scales each including a cyclic bit siring with an arbitrary length are connected, an arbitrary long scale can be formed with high productivity by combining different outputs of two sensors without increasing the number of bits of the read sensors 202 and 203. Additionally, since cyclic bit strings with different arrangements can be formed, if the at least two sensors 202 and 203 are used, an absolute position can be specified without moving the sensors 202 and 203 in the front-and-rear direction while ensuring reliability.

More specifically, live number of skips is determined depending on how many cyclic bit strings in which the most significant bit is inverted appears behind. That is, when the most significant hit of a cyclic bit string is forcibly inverted, the cyclic period can be shortened by the number of skips. For example, as shown in FIG. 4C, consider the "00006"th bit string {000010000}. As the "00011"th bit string, that is the fifth bit string after that, a bit string {100010000} generated by inverting the most significant bit of the {00006}th bit string appears. Hence, when the most significant bit of the "00006"th bit string is inverted to make a skip to the "00011"th bit string, bit strings existing between them can be skipped, and the cyclic period can be shortened from 511 to 500.

There are 193 cyclic periods that can be shortened, and periods of about 76% can be implemented. Also, there are 238 periods that can be implemented by considering the presence/absence of 0, and periods of about 94% can be covered. Note that considering the presence absence of 0 means that, for example, 0s are forcibly added while keeping the cycle during a code change of 0001→1000, thereby making a code change of 0001→0000→1000. As described above, it is possible to adjust whether to make the cyclic period longer by 1 by adding 0000 (see non-patent literature 1). Furthermore, when the lap position is also changed, almost all periods can be created.

By making good use of the skip, in a 9-bit bit string, a bit string whose period is 511 or less can be created from an M-sequence bit string whose maximum period is 511. Hence, when a tap position is changed, or a skip is used in the 9-bit bit siring, the long scale 201 or the short scales 211, 212, 213, 214, and 21*k* with a desired length can be generated.

Also, a plurality of cyclic bit strings are generated using the method as described above for, for example, a 9- to 12-bit cyclic bit string. When these are combined, a long scale, for example, the long scale 201 having a length of about 15 m can be formed from the cyclic bit strings including a small number of bits. In addition, when cyclic bit strings generated from the same initial value are connected, a cyclic bit string that maintains the LFSR even at the connecting point without a failure can be obtained.

The signal output unit 302 moves the two sensors 202 and 203 simultaneously while keeping a predetermined distance, and handles the sensor outputs of the two sensors 202 and 203 as a set. For this reason, the signal processor 301 can specify an absolute position even in a state in which the sensors are at rest. Note that in this example embodiment, the description has been made using an example in which cyclic bit strings of M-sequence are connected However, the present invention is not limited to this, and the cyclic bit strings need not be cyclic bit strings of M-sequence.

According to this example embodiment, it is possible to provide a linear encoder capable of detecting an absolute position at a high accuracy (of the same level as a 1-meter scale) using conventional sensors while forming a long scale (the absolute length is about 15 m) by a small number of bits (9 to 12 bits). It is also possible to provide a scale having a desired resolution. Furthermore, since each of the short scales 211, 212, 213, 214, and 21k is read by the two sensors 202 and 203, double detection by the two sensors 202 and 203 is possible, and the reliability of detection data can be ensured. In addition, a cyclic bit string having an arbitrary length can be generated using the method of changing the tap position or the skip method. When a plurality of short scales in which a cyclic bit string with an arbitrary length is arranged are combined, a long scale having an arbitrary length can be implemented with high productivity.

THIRD EXAMPLE EMBODIMENT

Figure 5:
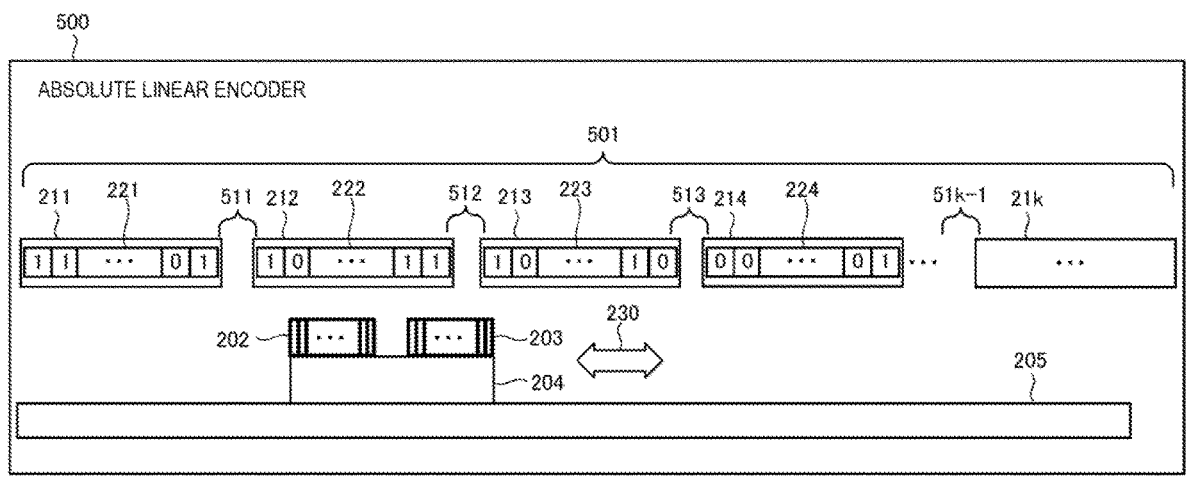
FIG. 5 is a view for explaining the outline of the overall arrangement of an absolute linear encoder according to the third example embodiment.

An absolute linear encoder 300 according to the third example embodiment of the present invention will be described next with reference to FIG. 5. FIG. 5 is a block diagram for explaining the outline of the overall arrangement of the absolute linear encoder 500. The absolute linear encoder 500 according to this example embodiment is different from the second example embodiment in that short scales are arranged at intervals. The rest of the components and operations is the same as in the second example embodiment Hence, the same reference numerals denote similar components and operations, and a detailed description thereof will be omitted.

The absolute linear encoder 500 includes a long scale 501. The long scale 501 includes short scales 211, 212, 213, 214, and 21k. The short scales 211, 212, 213, 214, and 21k included in the long scale 501 are arranged at intervals 511 to 51k-1.

For example, as shown in FIG. 5, if a sensor 203 detects the interval 51, a sensor 202 arranged apart from the sensor 203 by a predetermined distance reads a cyclic bit string 222 on the short scale 212. As described above, even if one sensor 203 of the two sensors 202 and 203 detects the intervals 511 to 51k-1. the other sensor 202 reads a cyclic bit string on the short scale. Even if the output from the sensor 202 or the sensor 203 is not obtained, that is, even if the sensor 202 or the sensor 203 detects one of the intervals 511 to 51k-1, an absolute position can be detected by taking the combination of the output bits of the sensors 202 and 203 into consideration. Note that a description has been made here using an example in which two sensors and k short scales are used. However, an absolute position can similarly be detected even if at least one of three or more sensors detects the intervals 511 to 51k-1 in an example in which three or more sensors and k short scales are used.

According to this example embodiment, it is possible to provide an absolute linear encoder capable of reliably detecting an absolute position even if short scales are arranged at intervals.

OTHER EXAMPLE EMBODIMENT

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims A system or apparatus including any combination of the individual features included in the respective example embodiments may be incorporated in the scope of the present invention.

What is claimed is:

1. An absolute linear encoder comprising:
a long scale formed by continuously connecting a first short scale and a second short scale in which a first cyclic bit string and a second cyclic bit string generated using the same initial value for different generator polynomials are arranged; and
at least two sensors arranged at positions facing the long scale side by side in a longitudinal direction of the long scale.

2. The absolute linear encoder according to claim 1, wherein each of the first cyclic bit string and the second cyclic bit string is a cyclic bit string generated by an n-order generator polynomial, and
at least one of the at least two sensors is an n-bit sensor.

3. The absolute linear encoder according to claim 1, wherein the first cyclic bit string is a cyclic bit string of an M-sequence.

4. The absolute linear encoder according to claim 1, wherein the two sensors are sensors including the same number of bits.

5. The absolute linear encoder according to claim 1, wherein the first short scale and the second short scale have the same length.

6. The absolute linear encoder according to claim 1, wherein the first short scale and the second short scale are arranged at an interval, and the interval is detected by at least one sensor included in the at least two sensors.

* * * * *